(12) United States Patent
Rafanavičius

(10) Patent No.: US 11,601,270 B1
(45) Date of Patent: *Mar. 7, 2023

(54) METHODS, SYSTEMS AND COMPUTER PROGRAM PRODUCTS FOR ROTATING CRYPTOGRAPHIC KEYS FOR ENCRYPTED FILES

(71) Applicant: UAB 360 IT, Vilniaus (LT)

(72) Inventor: Justas Rafanavičius, Vilniaus (LT)

(73) Assignee: UAB 360 IT

(*) Notice: Subject to any disclaimer, the term of this patent is extended or adjusted under 35 U.S.C. 154(b) by 0 days.

This patent is subject to a terminal disclaimer.

(21) Appl. No.: 17/952,883

(22) Filed: Sep. 26, 2022

Related U.S. Application Data

(63) Continuation of application No. 17/583,625, filed on Jan. 25, 2022, now Pat. No. 11,489,669.

(51) Int. Cl.
*H04L 9/08* (2006.01)
*G06F 21/60* (2013.01)

(52) U.S. Cl.
CPC .......... *H04L 9/0891* (2013.01); *G06F 21/602* (2013.01); *H04L 9/0894* (2013.01); *G06F 2221/2107* (2013.01)

(58) Field of Classification Search
CPC ... H04L 9/0891; H04L 9/0894; G06F 21/602; G06F 2221/2107
See application file for complete search history.

(56) References Cited

U.S. PATENT DOCUMENTS

| | | | |
|---|---|---|---|
| 2006/0047956 A1* | 3/2006 | Calvin | G06F 21/6218 713/165 |
| 2010/0005318 A1* | 1/2010 | Hosain | G06F 21/78 726/28 |
| 2010/0153747 A1* | 6/2010 | Asnaashari | H04L 9/0637 713/193 |
| 2015/0156174 A1* | 6/2015 | Fahey | H04L 63/18 713/168 |
| 2015/0379072 A1* | 12/2015 | Dirac | G06N 20/00 707/693 |
| 2019/0349186 A1* | 11/2019 | Lapworth | H04L 9/0637 |
| 2020/0193033 A1* | 6/2020 | Kurmi | H04L 67/1097 |

* cited by examiner

*Primary Examiner* — Henry Tsang
(74) *Attorney, Agent, or Firm* — Ward and Smith, P.A.; Ryan K. Simmons

(57) ABSTRACT

Methods for rotating cryptographic keys to revoke access to encrypted data stored on a remote server. Obtaining a first cryptographic key from a key store. Generating a second cryptographic key at a user device. Obtaining a first chunk of data from an encrypted file stored on the remote server. Decrypting the first chunk of data using the first cryptographic key to provide a decrypted first chunk of data. Re-encrypting the decrypted first chunk of data using the second cryptographic key to provide a re-encrypted first chunk of data. Uploading the re-encrypted first chunk of data to the remote server from non-persistent storage. Repeating the steps until an entire encrypted file has been decrypted and re-encrypted. Combining all the re-encrypted chunks of the encrypted file to provide a reassembled encrypted file that is associated with the second cryptographic key. Updating the remote server with the reassembled encrypted file associated with the second cryptographic key. Storing the second cryptographic key in place of the first cryptographic key.

20 Claims, 6 Drawing Sheets

US 11,601,270 B1

METHODS, SYSTEMS AND COMPUTER PROGRAM PRODUCTS FOR ROTATING CRYPTOGRAPHIC KEYS FOR ENCRYPTED FILES

RELATED APPLICATIONS

This application is a continuation of and claims priority to U.S. patent application Ser. No. 17/583,625, entitled "Methods, Systems and Computer Program Products for Rotating Cryptographic Keys for Encrypted Files" filed on Jan. 25, 2022, the application of which is incorporate herein by reference in its entirety.

TECHNICAL FIELD

The present inventive concept generally relates to data storage and, more particularly, to encrypted data and access thereto.

BACKGROUND

Cloud storage of data is very popular. A cloud storage provider offers the ability to place and retain data in an off-site storage system without having to maintain physical equipment on site. Data storage service providers (DSSP) generally use cryptographic tools to ensure the security of the stored data. Cryptographic tools involve encrypting and decrypting the stored data using cryptographic keys, either symmetric (single key) or asymmetric (public and private key pair). The DSSP generally provides the client application/module that enables a user of a user device (separate from the DSSP) to encrypt and decrypt the data stored by the DSSP. Generally, using the client application, a user creates a unique master password that is used for access to the encrypted files on the DSSP server.

In some cases a DSSP provides functionality for a first user to securely access shared data, belonging to a second user or the DSSP provides functionality for, for example, a business administrator, to securely provide access for selected users. In both of these cases, a second user or a business administrator can revoke access to selected data for a first user. However, the process for revoking access to data for the first user can often be complicated, time consuming and may result in errors. Accordingly, improved systems for revoking access are desired.

SUMMARY

Some embodiments of the present inventive concept provide methods for rotating cryptographic keys to revoke access to encrypted data stored on a remote server. The methods include obtaining, from the remote server, at least one first cryptographic key from a key store associated with a digital storage service provider (DSSP), wherein the key store is stored on the remote server; generating at least one second cryptographic key at a user device; obtaining a first chunk of data from an encrypted file stored on the remote server, the first chunk of data being at least a portion of the encrypted file; decrypting the obtained first chunk of data from the encrypted file using the at least one first cryptographic key to provide a decrypted first chunk of data; re-encrypting the decrypted first chunk of data from the encrypted file using the at least one second cryptographic key to provide a re-encrypted first chunk of data; uploading the re-encrypted first chunk of data to the remote server from non-persistent storage on the user device; repeating the obtaining, decrypting and re-encrypting chunks of the encrypted file until it is determined that an entire encrypted file has been decrypted and re-encrypted; combining all re-encrypted chunks of the encrypted file at the remote server when it is determined that the entire encrypted file has been decrypted and re-encrypted to provide a reassembled encrypted file that is associated with the at least one second cryptographic key; updating the remote server with the reassembled encrypted file associated with the at least one second cryptographic key; and storing the at least one second cryptographic key in place of the at least one first cryptographic key.

In further embodiments, storing may be followed by removing all copies of the encrypted file associated with the at least first cryptographic key from both the remote server and/or the user device.

In still further embodiments, removing may be followed by disassociating a link to the reassembled encrypted data with the user device.

In some embodiments, the decrypting and re-encrypting of the chunks of data from the encrypted file may be performed in a non-persistent memory location at the user device, network configurations and/or limitations of non-persistent storage capacity on the user device.

In further embodiments, a size of the chunks of data may be adjustable based on non-persistent storage capacity at the user device, network configurations and/or limitations of non-persistent storage capacity on the user device.

In still further embodiments, more than one chunk of data may be decrypted and re-encrypted at a same time.

Related non-transitory machine-readable medium and computer embodiments are also provided.

DETAILED DESCRIPTION OF EMBODIMENTS

Figure 1:
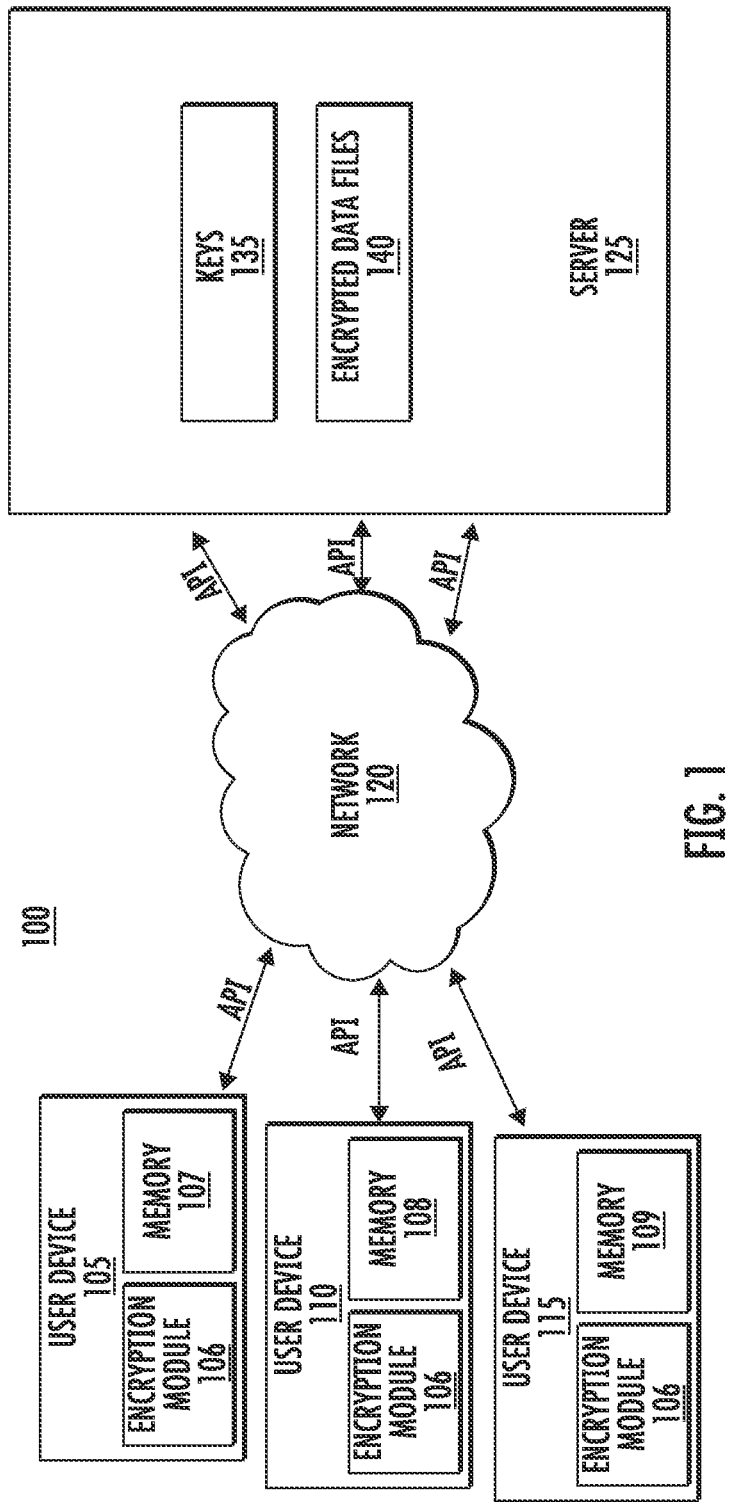
FIG. 1 is a block diagram illustrating a system including user devices including an encryption module for accessing encrypted data from a remote server in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words. A or P or C includes any or all of the following alternative combinations as appropriate for a particular usage: A alone: alone; C alone; A and B only; A and C only: B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed in the background, cloud storage of data is very popular. A cloud storage provider offers the ability to place and retain data in an off-site storage system without having to maintain physical equipment on site. Data storage service providers (DSSP) generally use cryptographic tools to ensure the security of the stored data. Cryptographic tools involve encrypting and decrypting the stored data using cryptographic keys, either symmetric (single key) or asymmetric (public and private key pair). The DSSP generally provides the client application/module that enables a user of a user device (separate from the DSSP) to encrypt and decrypt the data stored by the DSSP. Generally, using the client application, a user creates a unique master password that is used for access to the encrypted files on the DSSP server.

In some cases, a DSSP provides functionality for a first user to securely access shared data, belonging to a second user or the DSSP provides functionality for, for example, a business administrator, to securely provide access for selected users. In both of the cases, a second user or a business administrator can revoke access to selected data for a first user. Currently, to revoke access, first an encrypted file is downloaded from the DSSP server to a user/client device. New cryptographic keys may be obtained at the user/client device or generated on the user/client device. The old cryptographic key is used to decrypt the downloaded file and then the file is re-encrypted with the new cryptographic key. The newly re-encrypted file is then uploaded back to the DSSP server to be stored. All encrypted data is deleted from the client device and any links to the data are dissociated with the user device. This conventional process for revoking access to data for the first user can often be complicated, time consuming and may result in errors.

For example, since the encrypted file must be downloaded from the DSSP server to the client device to perform the decryption/re-encryption process, the likelihood that the download or upload process may experience connection issues on the network is high, especially for larger files. Furthermore, the downloaded file is temporarily stored on a persistent storage device, for example, a hard drive or solid-state drive, during the process. Storing the file in persistent storage may require additional clean-up after the key rotation is completed. This additional process may include deletion of the plain-text file from persistent storage. Failure to delete this file may lead to unintended data leaks, which is especially important if key rotation is performed on a non-trusted machine.

In other words, after the access to data is revoked, the malicious first user may find a way to access the restricted files with the initial cryptographic keys, for example, using a Memory Sniffer tool, reverse engineering the Client Application, halting the re-encryption procedure, and the like. Thus, the additional clean up stage is needed, and it may cause security issues.

Accordingly, some embodiments of the present inventive concept provide methods, systems and computer program products that secure files during the rotation of the keys and the decryption/re-encryption process. As will be discussed herein, some embodiments of the present inventive concept download the encrypted file to the client device in "chunks" and the chunks are decrypted and re-encrypted until the entire file has been processed. As used herein, in some embodiments, a "chunk" of a file refers to a portion of a larger file. However, it will be understood that the "chunk" may be a whole file if the file is small enough to be communicated in a single chunk. It will be understood that the size of the chunk may be customizable and may change depending on a particular system without departing from the scope of the present inventive concept. Performing the process in chunks may reduce the number of errors due to connection errors discussed above with respect to conventional methods. Furthermore, embodiments of the present inventive concept may avoid using persistent storage, which may eliminate the need for an additional stage of clean up as discussed below with respect to the figures.

Referring first to FIG. 1, a system 100 including multiple user devices and a server 125 for secure data storage will be discussed. The server 125 may be a DSSP server in some embodiments, but embodiments of the present inventive concept are not limited thereto. The system 100 of FIG. 1 is provided for example only. Thus, although three user devices, one network and one server are shown, there may be more or less of each and the elements of the system may be combined or split into more elements without departing from the scope of the present inventive concept.

As illustrated in FIG. 1, the system 100 includes three user devices 105, 110 and 115, the server 125 and a network 120 facilitating communication therebetween. As further illustrated, the system 100 includes a series of Application Programming Interfaces (APIs). Each API is a software intermediary that allows the user devices 105, 110 and 115 to communicate with the server 125 through the network 120. These APIs can be customized based on each individual user or customer. The network 120 may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks without departing from the scope of the present inventive concept.

As further illustrated in FIG. 1, each user device 105, 110 and 115 includes an associated memory 107, 108 and 109, respectively, as well as an encryption module 106. The memory 107, 108 and 109 may be any type of memory, non-persistent or persistent, known to those having skill in the art. The server 125 may be, for example, a DSSP server in some embodiments. However, the server 125 may also be a server maintained by the customer itself without departing from the present inventive concept. The server 125 includes keys 135 and encrypted data files 140 stored therein. Although only one key file 135 and one encrypted data file 140 is shown in FIG. 1, more than one of each can be included without departing from the scope of the present inventive concept. In some embodiments, the key file 135 may be referred to as a "key store" and the encrypted data file 140 may be referred to as a "data store." The encryption module 106 in each user device 105, 110 and 115 enables the user device to encrypt and decrypt data files using a master password that is used to access the encrypted files.

Figure 2:
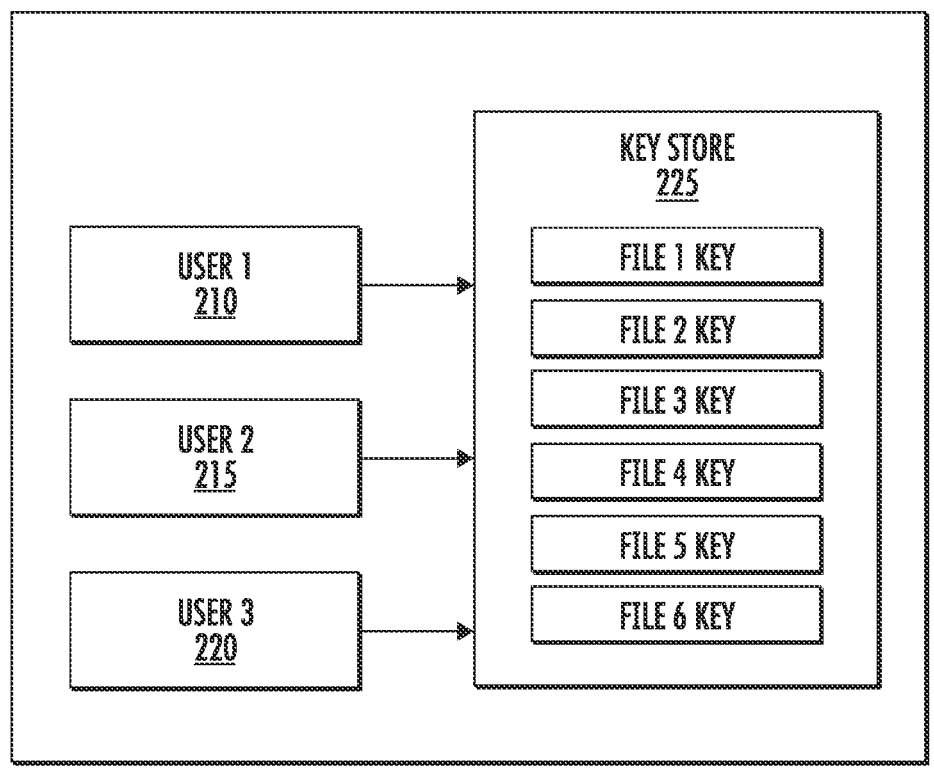
FIG. 2 is a block diagram illustrating user interaction with a key store in accordance with some embodiment of the present inventive concept.

It will be understood that in some embodiments of the present inventive concept the system allows multiple users to access encrypted files and encryption keys for those files, each file having its own encryption key. This concept is illustrated in FIG. 2. As shown in FIG. 2, user 1 210, user 2 215 and user 3 220 all have access to the "key store" including the encryption keys for each of files 1 through 6. FIG. 2 is provided for example only and embodiments are not limited thereto. Embodiments of the present inventive concept provide a mechanism for controlling user access to encrypted files and controlling access to encryption keys for those files. When a user's access to one or more files is revoked, embodiments of the present inventive concept remove the user's ability to retrieve encrypted files and retrieve encryption keys for those files. While this is safe access control wise, it may not be safe in a cryptographic sense, since file encryption keys can be cached, and encrypted files can be retrieved using other means. Thus, embodiments of the present inventive concept change the file encryption key for all users who still retain access, so that even if the system is compromised, further changes to data after the key revocation cannot be seen by users whose access has been revoked.

Figure 3:
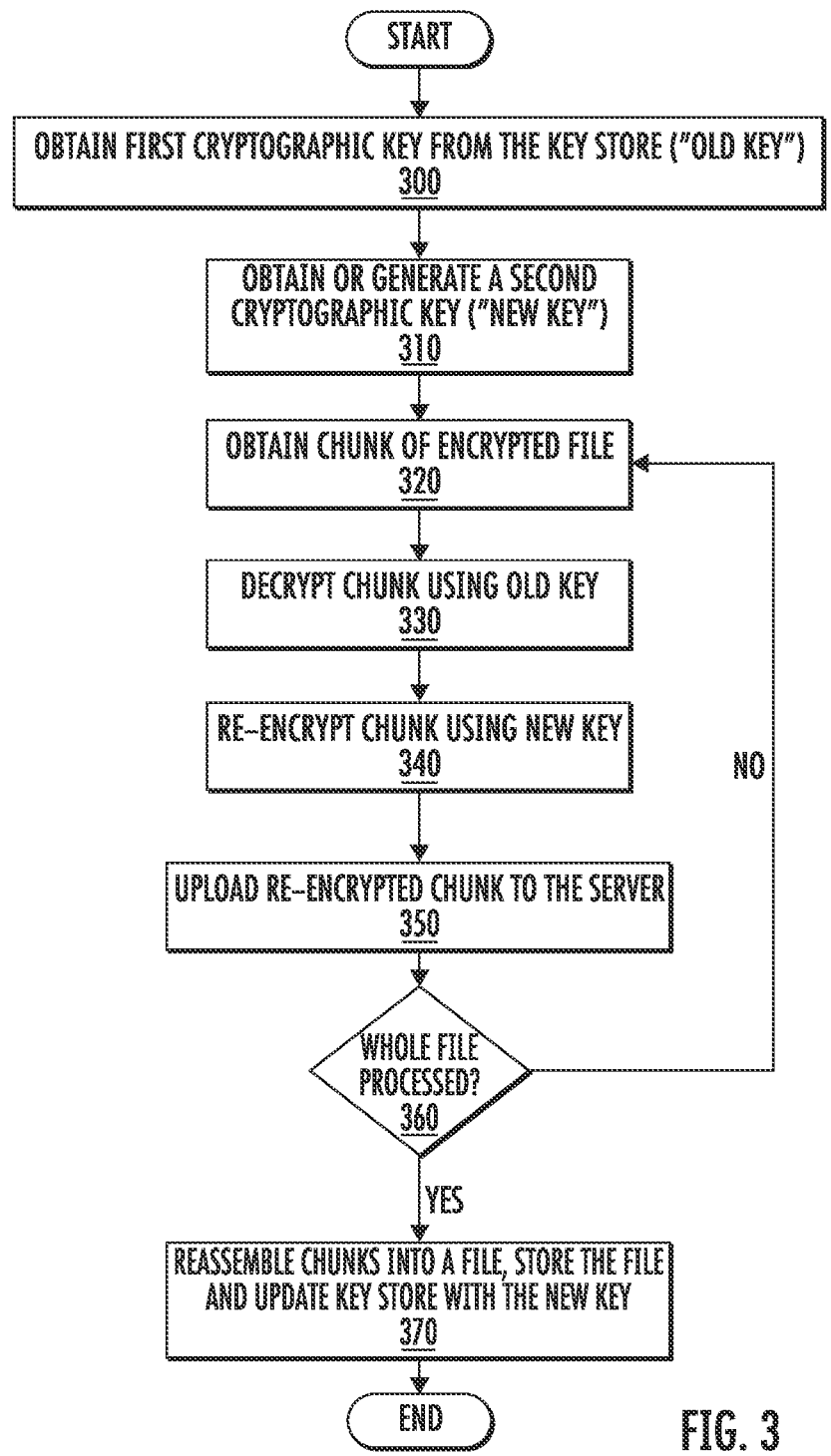
FIG. 3 is a flowchart illustrating operations for rotating cryptographic keys to revoke access to encrypted data stored on a remote server in accordance with some embodiments of the present inventive concept.

Example operations in accordance with some embodiments of the present inventive concept will now be discussed with respect to FIG. 1 and the flowchart of FIG. 3. As illustrated in FIG. 3, operations for rotating cryptographic keys to revoke access to encrypted data stored on a remote server begin at block 300 by obtaining at least one first cryptographic key from key store associated with, for example, a digital storage service provider (DSSP). As illustrated in FIG. 1, the key store may be located in a remote server 125 and accessed using the encryption module 106 on the user device 105, 110 and 115 through the network 120.

The first cryptographic key may also be referred to as the "old key" herein, indicating that this is the key being replaced. Once the first cryptographic key is obtained at the user/client devices, a second cryptographic key is generated using the encryption module 106 (block 310). As used herein, the second cryptographic key may be referred to as the "new key," the new key replacing the old key.

It will be understood that in some embodiments, the DSSP or server, does not know the cryptographic keys to conform with security measures for the system. Thus, embodiments of the present inventive concept generally require a user performing key rotation as discussed herein to generate keys on the user/client device, i.e. a local machine/device, perform the key rotation, and then send the "new key" in an encrypted form to the key store, replacing the "old key," which is/was in an encrypted form as well. Thus, embodiments of the present inventive concept allow key storage in a "key store" without actually ever revealing the keys in an unencrypted form on a back-end of the product. In further embodiments, the "key store" may include links to the files on the DSSP server. The links to the files are also stored in encrypted form.

Referring again to FIG. 3, a first "chunk" of an encrypted file stored on the remote server is obtained (block 320). As discussed above, a "chunk" is at least a portion of the encrypted file. In some embodiments, when the file is small, a single chunk may include the whole file. However, when the file is larger, the file will be broken up into multiple chunks. The first chunk of the encrypted file is decrypted using the at least one first cryptographic key ("old key") to provide a decrypted first chunk of data (block 330). The first decrypted chunk of data is re-encrypted using the at least one second cryptographic key ("new key") (block 340). The re-encrypted first chunk of data is uploaded to the remote server from non-persistent storage on the user device (block 350). It should be understood that the decryption and encryption of the data in accordance with embodiments discussed herein is performed in non-persistent storage on the user device, for example, in random access memory (RAM).

It is determined if the entire encrypted file has been processed, i.e., decrypted with the old key and re-encrypted with the new key (block 360). If it is determined that the entire file has not been processed (block 360), operations return to block 320 and repeat until it is determined that the entire file has been processed (block 360). If, on the other hand, it is determined that the entire file has been processed (block 360), all re-encrypted chunks of the encrypted file are combined/reassembled at the remote server to provide a reassembled encrypted file that is associated with the at least one second cryptographic key (new key). The reassembled file is stored at the server and the second cryptographic key (new key) associated with the reassembled file is stored in the "key store" in place of the old key (block 370).

In some embodiments, the timing of when the chunks of the re-encrypted file are reassembled may be determined at the server 125. For example, a processor on the server 125 may inspect metadata of the newly re-encrypted chunks of data, for example, size of the data, type of data, various attributes associated with the data and the like, and may determine when to start the re-assembly process. It will be understood that this is only one example of triggering the reassembly process and embodiments of the present inventive concept are not limited thereto.

Once the re-encrypted file is stored and the new key is in place, some embodiments of the present inventive concept will perform a clean up process at the user device and/or the server. The clean up process may include removing any old keys from the user device as well as any remaining portions of versions of the encrypted file. More details with respect to the clean-up process will be discussed with respect to the more detailed flowchart of FIG. 5.

As discussed with respect to FIGS. 1 through 3, some embodiments of the present inventive concept provide a solution that secures files when keys are being rotated and specifically during the decryption/re-encryption process. As discussed above, the encrypted file is downloaded to the user/client device and the decryption and re-encryption is performed thereon in non-persistent storage. The new cryptographic keys are generated at the user/client device. As discussed herein, instead of downloading the files all at once and decrypting/re-encrypting the whole file at once, embodiments of the present inventive concept operate on "chunks" of files. Thus, the files are decrypted and re-encrypted in parts. Therefore, not only the cryptographic keys, but the downloaded files are stored on a user device in non-persistent storage, for example, RAM, instead of persistent storage such as hard disk drive (HDD), solid state drive (SSD), an secure digital (SD) card, a flash drive, and the like.

Embodiments of the present inventive concept discussed herein provide many advantages over the conventional approach. For example, as discussed, in some embodiments not a single byte of the plain-text file is stored on persistent storage during the process, which reduces the likelihood of unintended data leaks. Furthermore, network transactions performed in "chunks" allow transactions interrupted by, for example, a network problem, to easily resume after failure. By adjusting "chunk" size, embodiments discussed herein may be adapted for various network configurations and account for limitations of non-persistent storage capacity on a user device. Recovering data from non-persistent storage is far more difficult than recovering data from persistent storage. A power-cycle event, such as a machine power-off and power-on, or a secure memory wipe makes data recovery from non-persistent storage almost impossible. Thus, use of the non-persistent storage at the user device reduces the likelihood that confidential information from the encrypted file could be recovered.

In some embodiments, multiple "chunks" of data may be processed in parallel to decrease the amount of time to decrypt and re-encrypt the entire file. Thus, the system may work on various separate chunks at the same time, thus increasing data throughput and better-utilizing resources of a user's local machine. A parallel system is illustrated, for example, in the flowchart of FIG. 4. The operations of each block is the same or similar as discussed above with respect to FIG. 3, but more than one chunk is being processed at one time. Although FIG. 4 only shows two parallel processes, more than two may be present without departing from the scope of the present inventive concept. Furthermore, more than one key rotation process may be performed at one time as well. Thus, several key rotations may be performed in parallel without departing from the scope of the present inventive concept.

Referring now to the flowchart of FIG. 5, a more detailed flowchart illustrating operations for rotating cryptographic keys to revoke access to encrypted data stored on a remote server in accordance with some embodiments of the present inventive concept will be discussed. Many of the operations illustrated in FIG. 5 are similar to those discussed above with respect to FIG. 3 and therefore all details may not be repeated herein.

Figure 5:
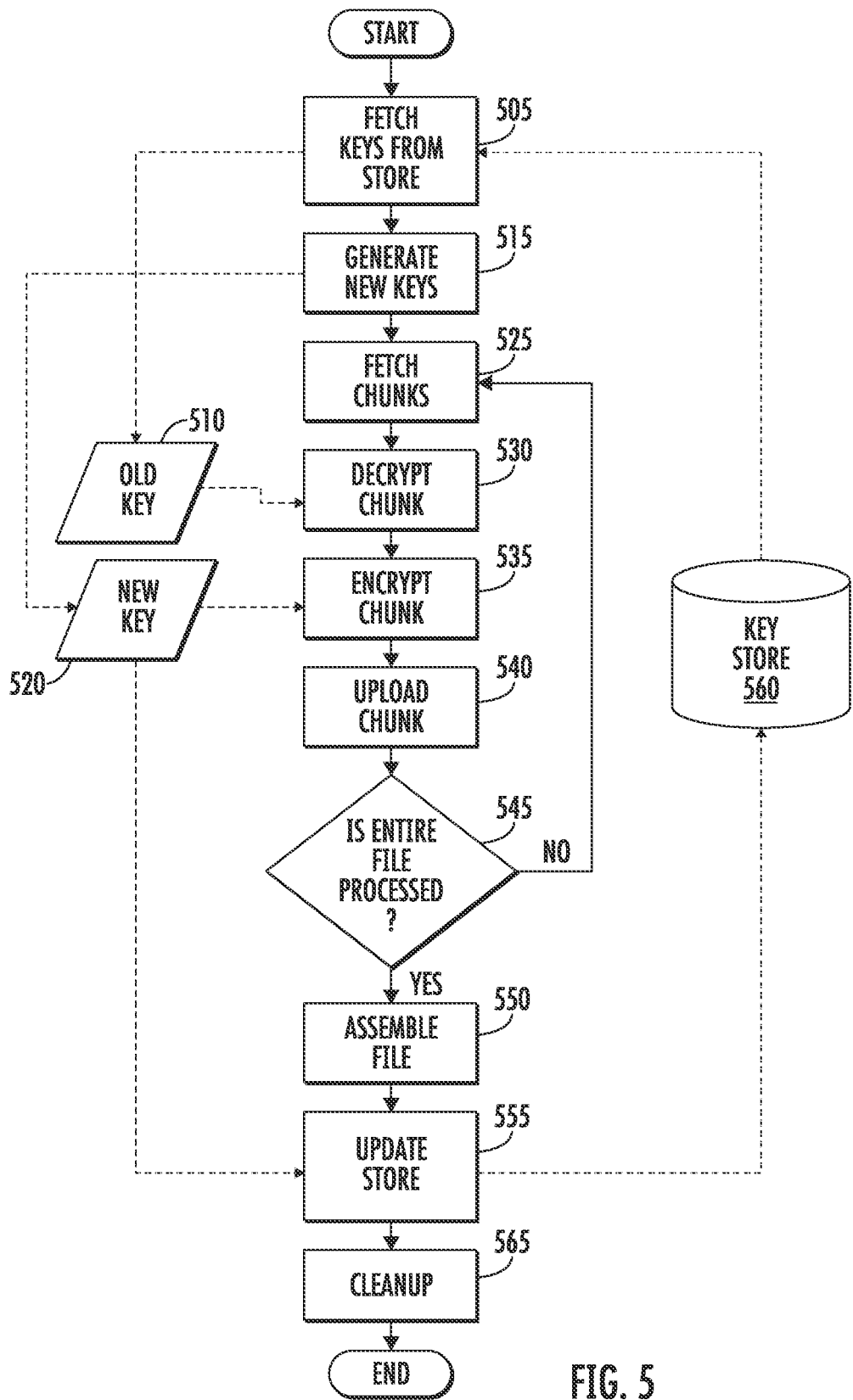
FIG. 5 is a more detailed flowchart illustrating operations in accordance with some embodiments of the present inventive concept.

As illustrated in FIG. 5, operations begin at block 505 by fetching keys from the "key store." In other words, the encryption module or application on the user device obtains the "old key" 510 from the key store (block 560) at the remote server. A "new key" 520 is generated using the encryption application (block 515). As used herein, "new keys" 520 refer to newly generated cryptographic keys that have not been used to encrypt or decrypt a file. "Old keys" 510 refer to keys previously used for file encryption or decryption, or keys previously stored on a user device 105, 110 and 115 prior to the revocation of access to selected files by a third party, for example, a system administrator. It will also be understood that the keys can be any type of cryptographic keys without departing from the scope of the present inventive concept.

Once both keys are available, a "chunk" of an encrypted file is obtained from the server (block 525) and is decrypted using the "old key" (block 530) and re-encrypted using the new key (block 535). The re-encrypted chunk is uploaded to the server from the non-persistent storage of the user device (block 540). As discussed above, the size of the chunk of data may be adjusted based on configurations of the system and/or size of the non-persistent storage capacity of the user device. In other words, if the non-persistent storage is too small to handle the chunk size, the chunk size may be made smaller.

Figure 4:
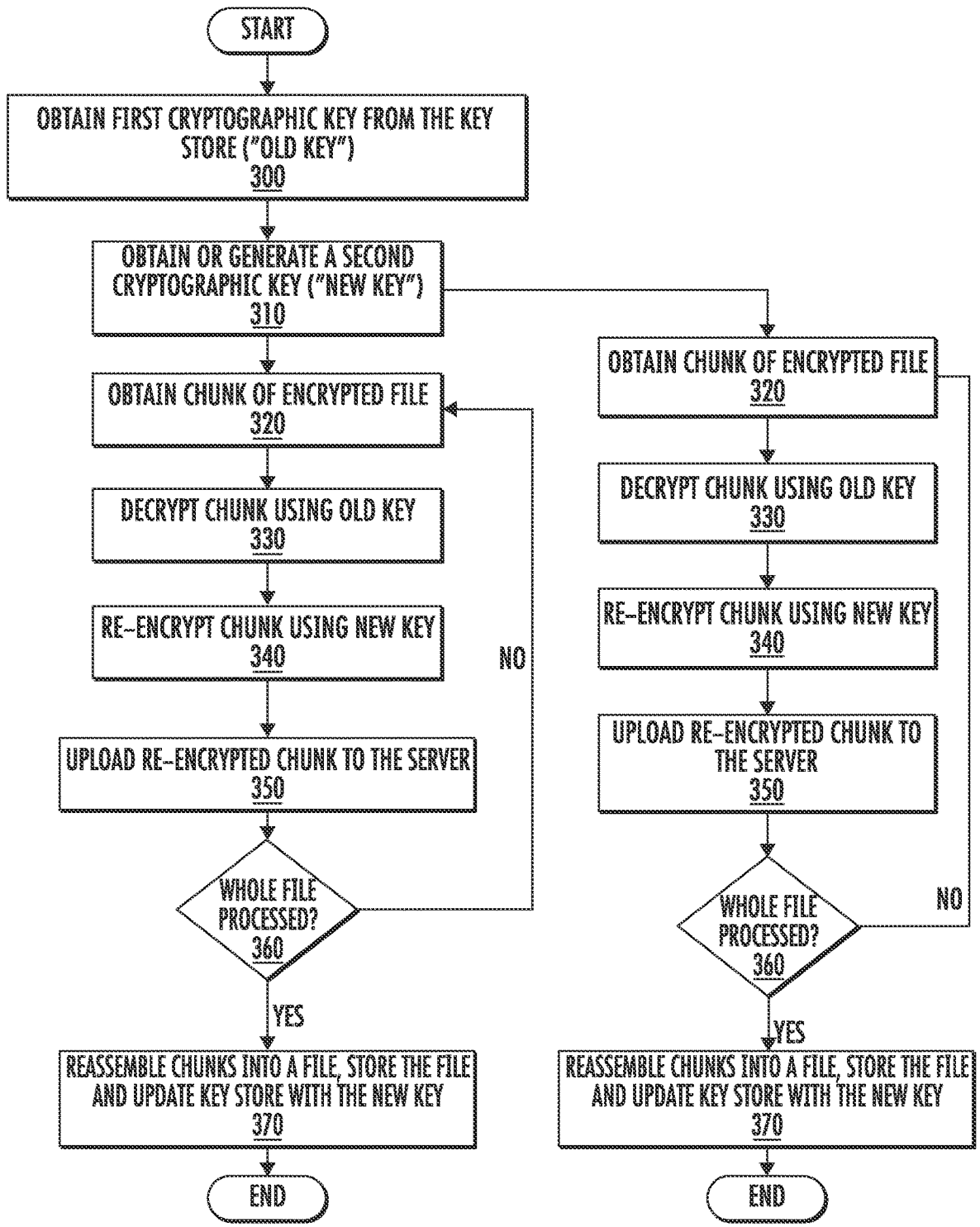
FIG. 4 is a flowchart illustrating parallel operations for rotating cryptographic keys to revoke access to encrypted data stored on a remote server in accordance with some embodiments of the present inventive concept.

Once the chunk is uploaded, it is determined if the entire file has been processed (block 545). If it is determined that the entire file has not been processed (block 545), operations return to block 525 and repeat until it is determined that the entire file has been processed (block 545). As discussed above, in some embodiments, more than one chunk may be processed at time as illustrated in FIG. 4. Furthermore, more than one key rotation may be performed at one time.

Once it is determined that the entire file has been processed (block 545), all re-encrypted chunks of the file are reassembled/combined (block 550) to provide a reassembled encrypted file that is associated with the new key. Operations proceed to block 555, wherein the key store 560 is updated with the new key at the remote server 125 and the newly re-encrypted file is stored at the server associated with the new key. It will be understood that the keys in the key store are stored in encrypted form. After the file and key are updated, some embodiments of the present inventive concept perform a clean-up process (block 565) where, for example, all copies of the encrypted file associated with the old key may be deleted from the server and/or the user device.

Figure 6:
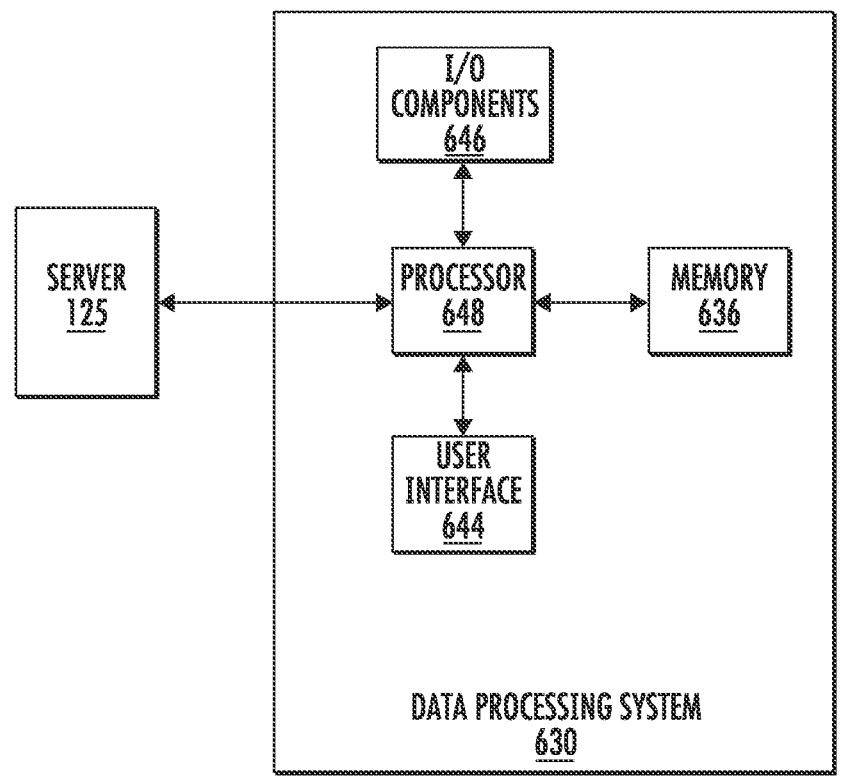
FIG. 6 is a block diagram of a data processing system for use in accordance with some embodiments of the present inventive concept.

As is clear from the details of the present inventive concept, embodiments of the present inventive concept require data processing. Referring now to FIG. 6, an example of a data processing system 630 suitable for use with any of the examples described above will be discussed. Although the example data processing system 630 is shown as in communication with server 125 in accordance with embodiments of the present inventive concept, the data processing system 630 may be part of any component of the system without departing from the scope of the present inventive concept. In some examples, the data processing system 630 can be any suitable computing device for performing operations according to the embodiments discussed herein described herein.

As illustrated, the data processing system 630 includes a processor 648 communicatively coupled to I/O components 646, a user interface 644 and a memory 636. The processor 648 can include one or more commercially available processors, embedded processors, secure processors, microprocessors, dual microprocessors, multi-core processors, other multi-processor architectures, another suitable processing device, or any combination of these. The memory 636, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 630.

I/O components 646 may be used to facilitate wired or wireless connections to devices such as one or more displays, game controllers, keyboards, mice, joysticks, cameras, buttons, speakers, microphones and/or other hardware used to input or output data. Memory 636 represents non-volatile storages such as magnetic, optical, or other storage media included in the data processing system and/or coupled to processor 648.

The user interface 644 may include, for example, a keyboard, keypad, touchpad, voice activation circuit, display or the like and the processor 648 may execute program code or instructions stored in memory 636.

It should be appreciated that data processing system 630 may also include additional processors, additional storage, and a computer-readable medium (not shown). The processor(s) 648 may execute additional computer-executable program instructions stored in memory 636. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As briefly discussed above, some embodiments of the present inventive concept provide methods, systems and computer program products for exchanging cryptographic keys for decrypting files. These files are downloaded to the user device in "chunks" and decrypted using an old key and re-encrypted using a new key. Each chunk is uploaded back to the server upon completion of the process. Once all chunks have been processed, the file is reassembled, and the new key and new file are stored. Performing these operations in chunks allows for less error and may provide more efficient processing of the files.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A computer for rotating cryptographic keys to revoke access to encrypted data stored on a remote server, comprising:
   one or more processors; and
   a non-transitory computer readable medium to store a set of instructions executable by the one or more processors, the set of instructions to cause the one or more processors to:
   obtain, from the remote server, at least one first cryptographic key from a key store associated with a digital storage service provider (DSSP), wherein the key store is stored on the remote server;
   generate at least one second cryptographic key at a user device;
   obtain a first chunk of data from an encrypted file stored on the remote server, the first chunk of data being at least a portion of the encrypted file;
   decrypt the obtained first chunk of data from the encrypted file using the at least one first cryptographic key to provide a decrypted first chunk of data;
   re-encrypt the decrypted first chunk of data from the encrypted file using the at least one second cryptographic key to provide a re-encrypted first chunk of data;
   upload the re-encrypted first chunk of data to the remote server from non-persistent storage on the user device;
   repeat the obtaining, decrypting and re-encrypting chunks of the encrypted file until it is determined that an entire encrypted file has been decrypted and re-encrypted;
   combine all re-encrypted chunks of the encrypted file at the remote server when it is determined that the entire encrypted file has been decrypted and re-encrypted to provide a reassembled encrypted file that is associated with the at least one second cryptographic key;
   update the remote server with the reassembled encrypted file associated with the at least one second cryptographic key;
   store the at least one second cryptographic key in place of the at least one first cryptographic key; and
   perform a clean up process at the user device and/or the remote server, the clean up process including at least removing any first cryptographic keys from the user device and/or the server and remove all copies or portions of copies of the encrypted file associated with the first cryptographic keys from the server and/or the user device.

2. The computer of claim 1, the set of instructions to cause the one or more processors to further disassociate a link to the reassembled encrypted file with the user device after removing all copies of the encrypted file.

3. The computer of claim 1, the set of instructions to cause the one or more processors to further decrypt and re-encrypt the chunks of data from the encrypted file in a non-persistent memory location at the user device.

4. The computer of claim 1, wherein a size of the chunks of data are adjustable based on non-persistent storage capacity at the user device.

5. The computer of claim 1, the set of instructions to cause the one or more processors to further decrypt and re-encrypt more than one chunk of data at a same time.

6. The computer of claim 1, the set of instructions to cause the one or more processors to further determine, at the remote server, a time to begin combining the re-encrypted chunks by inspecting metadata of the re-encrypted chunks.

7. The computer of claim 6, wherein the metadata comprises one or more of a size of the chunks, a type of data included in the chunks, and attributes associated with the data in the chunks, the set of instructions to cause the one or more processors to further trigger the combining of the re-encrypted chunks at the determined time to begin combining.

8. A method for rotating cryptographic keys to revoke access to encrypted data stored on a remote server, the method comprising:
   obtaining, from the remote server, at least one first cryptographic key from a key store associated with a digital storage service provider (DSSP), wherein the key store is stored on the remote server;
   generating at least one second cryptographic key at a user device;
   obtaining a first chunk of data from an encrypted file stored on the remote server, the first chunk of data being at least a portion of the encrypted file;
   decrypting the obtained first chunk of data from the encrypted file using the at least one first cryptographic key to provide a decrypted first chunk of data;
   re-encrypting the decrypted first chunk of data from the encrypted file using the at least one second cryptographic key to provide a re-encrypted first chunk of data;
   uploading the re-encrypted first chunk of data to the remote server from non-persistent storage on the user device;
   repeating the obtaining, decrypting and re-encrypting chunks of the encrypted file until it is determined that an entire encrypted file has been decrypted and re-encrypted;
   combining all re-encrypted chunks of the encrypted file at the remote server when it is determined that the entire encrypted file has been decrypted and re-encrypted to provide a reassembled encrypted file that is associated with the at least one second cryptographic key;

updating the remote server with the reassembled encrypted file associated with the at least one second cryptographic key;

storing the at least one second cryptographic key in place of the at least one first cryptographic key; and performing a clean up process at the user device and/or the remote server, the clean up process including at least removing any first cryptographic keys from the user device and/or the server and removing all copies or portions of copies of the encrypted file associated with the first cryptographic keys from the server and/or the user device.

9. The method of claim 8, wherein removing is followed by disassociating a link to the reassembled encrypted file with the user device.

10. The method of claim 8, wherein the decrypting and re-encrypting of the chunks of data from the encrypted file are performed in a non-persistent memory location at the user device.

11. The method of claim 8, wherein a size of the chunks of data are adjustable based on non-persistent storage capacity at the user device, network configurations and/or limitations of non-persistent storage capacity on the user device.

12. The method of claim 8, wherein more than one chunk of data is decrypted and re-encrypted at a same time.

13. The method of claim 8, wherein combining the re-encrypted chunks of the encrypted file further is proceeded by determining, at the remote server, a time to begin combining the re-encrypted chunks by inspecting metadata of the re-encrypted chunks.

14. The method of claim 13, wherein the metadata comprises one or more of a size of the chunks, a type of data included in the chunks, and attributes associated with the data in the chunks, the method further comprising triggering the combining of the re-encrypted chunks at the determined time to begin combining.

15. At least one non-transitory machine-readable medium comprising a set of instructions executable on at least one computing device to cause the at least one computing device to rotate cryptographic keys to revoke access to encrypted data stored on a remote server, the set of instructions to:

obtain, from the remote server, at least one first cryptographic key from a key store associated with a digital storage service provider (DSSP), wherein the key store is stored on the remote server;

generate at least one second cryptographic key at a user device;

obtain a first chunk of data from an encrypted file stored on the remote server, the first chunk of data being at least a portion of the encrypted file;

decrypt the obtained first chunk of data from the encrypted file using the at least one first cryptographic key to provide a decrypted first chunk of data;

re-encrypt the decrypted first chunk of data from the encrypted file using the at least one second cryptographic key to provide a re-encrypted first chunk of data;

upload the re-encrypted first chunk of data to the remote server from non-persistent storage on the user device;

repeat the obtaining, decrypting and re-encrypting chunks of the encrypted file until it is determined that an entire encrypted file has been decrypted and re-encrypted;

combine all re-encrypted chunks of the encrypted file at the remote server when it is determined that the entire encrypted file has been decrypted and re-encrypted to provide a reassembled encrypted file that is associated with the at least one second cryptographic key;

update the remote server with the reassembled encrypted file associated with the at least one second cryptographic key;

store the at least one second cryptographic key in place of the at least one first cryptographic key; and perform a clean up process at the user device and/or the remote server, the clean up process including at least removing any first cryptographic keys from the user device and/or the server and remove all copies or portions of copies of the encrypted file associated with the first cryptographic keys from the server and/or the user device.

16. The non-transitory machine-readable medium of claim 15, the set of instructions executable on the at least one computing device to further disassociate a link to the reassembled encrypted file with the user device after removing all copies of the encrypted file.

17. The non-transitory machine-readable medium of claim 15, the set of instructions executable on the at least one computing device to further decrypt and re-encrypt the chunks of data from the encrypted file in a non-persistent memory location at the user device.

18. The non-transitory machine-readable medium of claim 15, wherein a size of the chunks of data are adjustable based on non-persistent storage capacity at the user device.

19. The non-transitory machine-readable medium of claim 15, the set of instructions executable on the at least one computing device to further decrypt and re-encrypt more than one chunk of data at a same time.

20. The non-transitory machine-readable medium of claim 15, the set of instructions executable on the at least one computing device to further determine, at the remote server, a time to begin combining the re-encrypted chunks by inspecting metadata of the re-encrypted chunks.

* * * * *